J. S. PARK.
PLOW.
APPLICATION FILED APR. 12, 1909.
991,452.
Patented May 2, 1911.
2 SHEETS—SHEET 1.
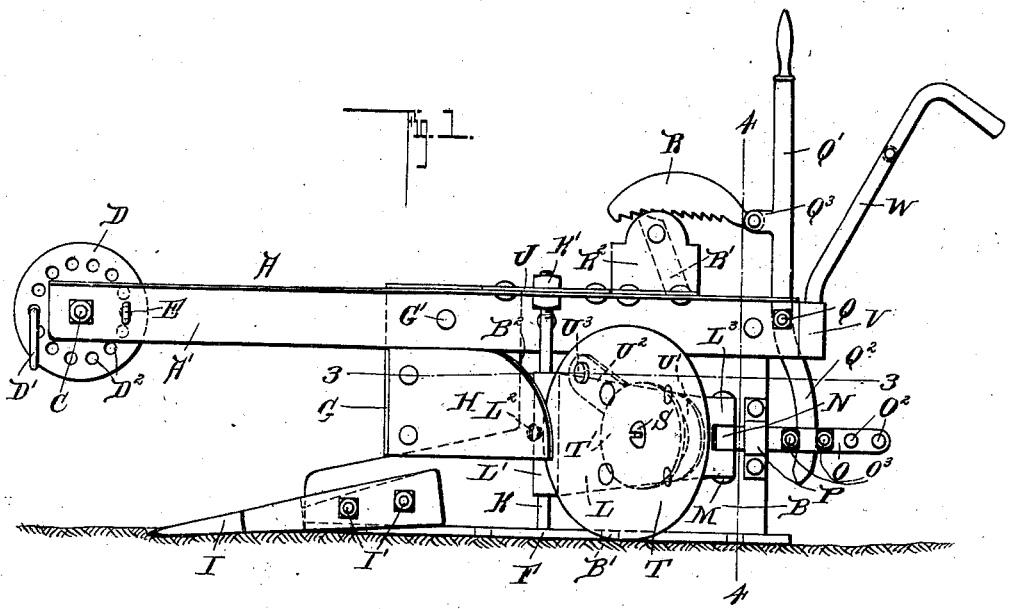
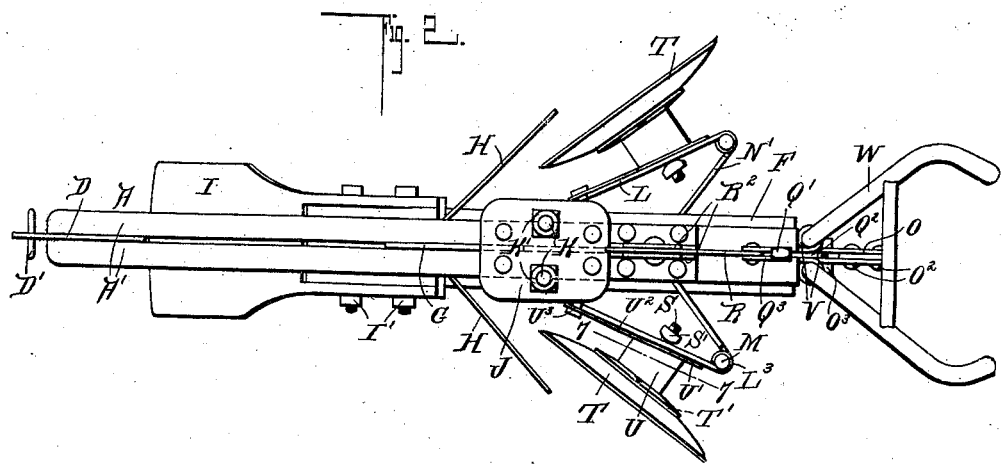
Witnesses
Philip H. Burch
Inventor
J. S. Park,
By J. H. Evans
Attorney

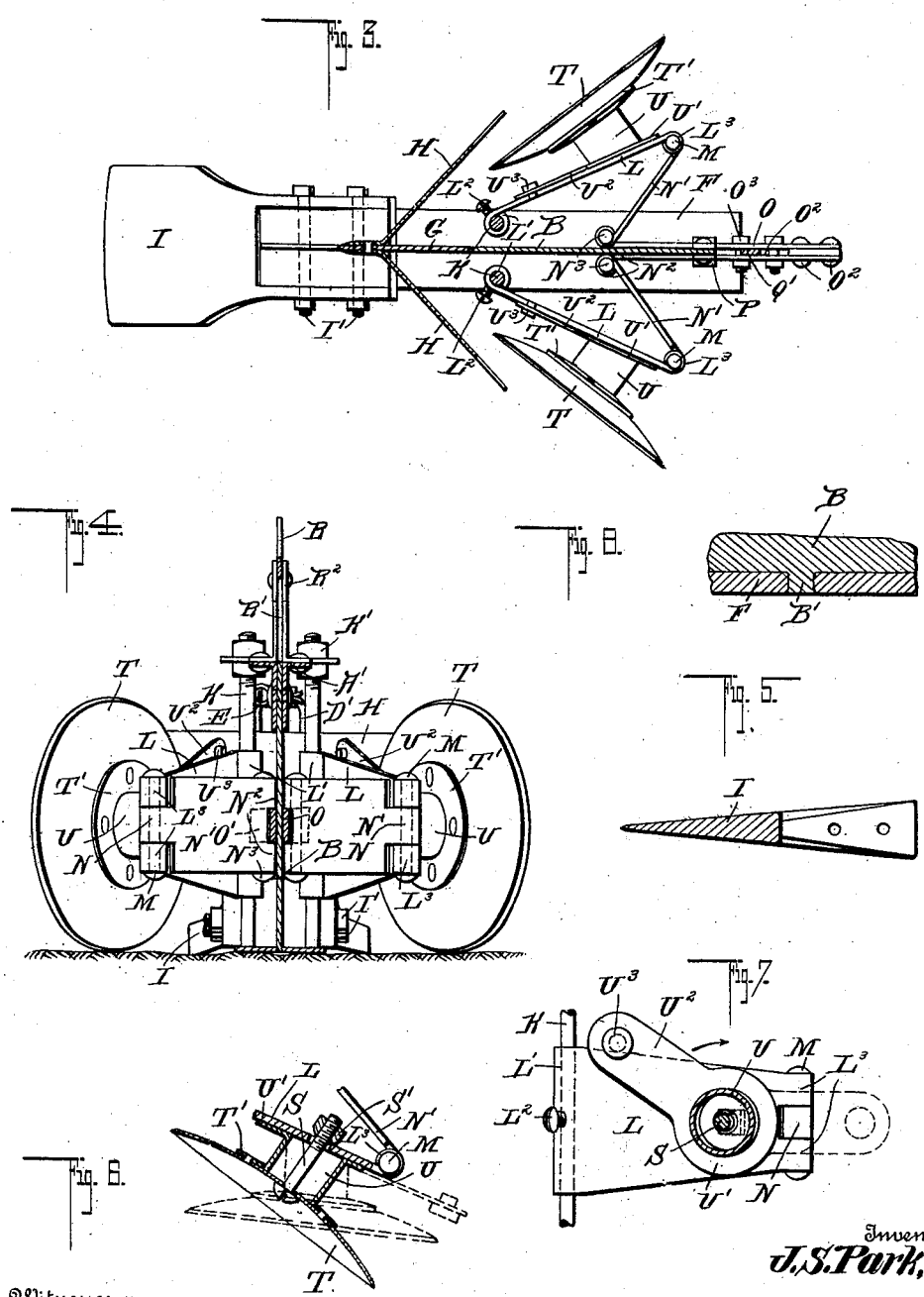

UNITED STATES PATENT OFFICE.

JOHN S. PARK, OF ROCKPORT, INDIANA.

PLOW.

991,452.  Specification of Letters Patent.  Patented May 2, 1911.

Application filed April 12, 1909. Serial No. 489,478.

*To all whom it may concern:*

Be it known that I, JOHN S. PARK, a citizen of the United States, residing in Rockport, in the county of Spencer and State of Indiana, have invented a new and useful Improvement in Plows, of which the following is a specification.

This invention relates to plows, and more particularly to the class of plows known as "shovel plows", the object being to provide a plow which is especially adapted to be used for cultivating and forming a ditch between the rows of corn, potatoes and the like.

A further object of the invention is to provide a plow with revolving disks for throwing the dirt which has been loosened by the shovel point up alongside of the rows of corn and the like.

A still further object of my invention is to provide novel means for supporting the disks in such a manner that they can be easily and quickly adjusted in order that the plow can be used between narrow or wide rows.

Another object of my invention is to provide the plow with a cutter to the rear of the shovel point, having outwardly and rearwardly extending deflecting wings adapted to throw the soil raised by the point in the path of the disks.

A still further object of my invention is to provide a plow which is exceedingly simple and cheap in construction and one which is very durable, the parts being so connected together that they are not likely to become out of order in use.

A still further object of the invention is to provide a plow in which the cutting blade and disks are so mounted that they can be easily and quickly detached so that the plow can be used for ordinary work.

Another object of my invention is to so mount the disks that they can be swung into such a position that the cutting edges of the same will not become injured when the plow is being dragged over a road.

With these various objects in view, my invention consists in the novel features of construction, combination and arrangement of parts, hereinafter fully described and pointed out in the claims.

In the drawings forming a part of this specification:—Figure 1 is a side elevation of my improved plow. Fig. 2 is a top plan view of the same. Fig. 3 is a section taken on line 3—3 of Fig. 1. Fig. 4 is a section taken on line 4—4 of Fig. 1. Fig. 5 is a longitudinal section through the shovel-point. Fig. 6 is a detail horizontal section through one of the disks, and a portion of the supporting means. Fig. 7 is a detail section taken on line 7—7 of Fig. 2, and Fig. 8 is a detail section through a portion of the standard, and shoe showing the manner of connecting the same together.

In carrying out my improved invention I employ a T-shaped beam A formed of two L-shaped bars A', which are secured over a standard B adjacent their rear ends so as to leave a space between the same at the forward end, which are connected together by a bolt C on which is pivotally mounted between the bars A', a disk-clevis D, carrying a ring D' and provided with a plurality of openings $D^2$ adapted to register with openings formed in the bars A', through which a pin E is adapted to be inserted, for locking the same in its adjusted position.

The standard B is preferably formed of a flexible grade of steel, and is provided with a series of tongues B' on its lower edge, adapted to fit within openings formed in a highly tempered heel F, and be secured by riveting the same. The forward end of the standard B is cut away at $B^2$ and in advance and resting on the cut away portion is mounted a knife G which extends up between the bars A' and is secured in position by a bolt G' passing transversely through the same and the bars, whereby the same can be readily detached when desired. The edge of the cut away portion of the standard B is beveled, and the lower edge of the knife G is also beveled to correspond with the same, and it will be seen that by removing the bolt G', and forcing the knife forwardly, it will slide down on the beveled portion of the standard so that it can be readily detached.

Secured to the sides of the knife G are deflecting wings H which extend outwardly and rearwardly so that the soil which is lifted up by the plow-point will be thrown outwardly as will be hereinafter fully described. The forward edges of the deflecting wings H, which are secured upon the knife G, are beveled to correspond with the bevel of the cutting edge of the knife, so that when the knife strikes a root or any other obstruction, such as a vine, it will make a clean cut without any danger of the same getting caught in the deflector.

Secured over the forward end of the standard B, is a reversible steel shovel-point I which is provided with recesses upon opposite sides, having inclined bottoms which are slotted longitudinally to receive the standard B which is provided with openings adapted to register with openings formed in the point, through which bolts I' are adapted to pass for securing the point firmly in position, and it will be seen by this construction that the point can be readily reversed when the lower side of the same becomes worn.

Arranged on the beam A is a plate J, which is secured thereon by bolts or rivets passing vertically through the same and the flanges of the beam, said plate being provided with openings in vertical alinement with openings formed in the heel, in which are pivotally mounted vertical shafts K which are locked into position by nuts K', so that the shafts can be readily detached, when desired. Secured on each of the shafts is a sleeve L' formed on the end of an arm L, said sleeve being locked in its adjusted position by a set-screw $L^2$, and it will be seen by this construction the arm can be adjusted vertically upon the shaft. The free ends of each of the arms L are provided with eyes $L^3$, spaced apart, between which are pivotally mounted on pintle pins M, the eyes N, of levers N' which are provided with spaced eyes $N^2$ carrying pintle pins $N^3$ on which are pivotally mounted the eyes O' of operating rods O, which are slidably mounted in guides P secured to the side of the standard B, said operating rods being connected together at their outer ends by rivets $O^2$.

Pivotally mounted between the bars A', of the beam A, adjacent their rear ends on a bolt Q, is a lever Q' which is provided with a curved lower end $Q^2$, which extends down between the operating rods O, the movement of the same being limited by bolts $O^3$ passing transversely through the operating rods which allows the lever to move between the same, as it is swung on its fulcrum, whereby the operating rods will be moved in and out in respect to the standard, so as to throw the arms L out, or draw the same in, for the purpose hereinafter fully described. The lever Q' is provided with an apertured lug $Q^3$, between which is pivotally mounted a ratchet bar R adapted to engage a fixed pawl R' secured between brackets $R^2$ mounted upon the beam for holding the lever in its adjusted position.

Extending outwardly from each of the arms L, is a shaft S which is locked therein by a nut S' and on the outer end of which is revolubly mounted a disk T provided with a collar T' on its inner face, which bears against a sleeve U which is provided with an oblique flange U' adapted to fit snugly up against the outer face of the arm L, said sleeve being provided with a lever $U^2$ carrying a pin $U^3$ at its outer end adapted to rest upon the upper edge of the arm L when the disk is moved into an operative position, so that when the lever is swung backwardly, as shown in dotted lines in Fig. 6, the cutting edge of the disk would be turned into such a position that the same will not become injured when the plow is dragged over a road. It will be seen that by the oblique collar this is accomplished, as when the lever is swung forwardly the disk is moved into the position to throw the soil up alongside of a row of corn or the like.

The rear ends of the bars A' of the beam A are bent to form sockets V in which are adapted to be placed the stems of a handle W which are preferably formed of tubes of metal connected together by a cross bar, as clearly shown, and it will be seen by this construction the handles can be easily and quickly detached or attached.

The operation of my improved plow is as follows: As the plow is drawn between the rows of corn, the soil is lifted up by the shovel-point, and thrown into the path of the disk by the deflecting wings, which cause the soil to be thrown up on both sides of the plow, and it will be seen that by operating the lever so as to move the disks in or out, the soil can be thrown as close to, or as far away from, the row of corn, as desired.

Having thus fully described my invention, what I claim as new and desire to secure by Letters Patent is:—

1. A plow comprising a beam formed of two L-shaped bars, a standard secured between said bars having a cutaway portion at its forward end provided with a beveled edge, a heel secured to the lower edge of said standard, a knife arranged between said bars of the beam having a beveled lower edge resting on the beveled edge of the standard, a reversible shovel point carried by the standard, and deflecting wings secured to the sides of said knife.

2. A plow comprising a beam, a standard carried by said beam, a shoe carried by said standard, a shovel-point reversibly mounted on said standard, a cutting knife provided with deflecting wings removably mounted on said standard to the rear of said shovel point pivotally mounted arms carried by said beam and heel, disks carried by said arms and means for adjusting the positions of said arms.

3. A plow comprising a T-shaped beam, a standard carried by said beam provided with a heel, a shovel point secured to said standard, shafts carried by said beam and heel, arms carried by said shafts, disks carried by said arms, and means for adjusting the position of said arms.

4. A plow comprising a heel, a standard carried by said heel, a beam carried by said standard, a shovel point secured to the forward end of said standard, deflecting wings arranged to the rear of said shovel point, arms pivotally mounted vertically alongside of said standard, disks revolubly mounted on said arms, levers connected to said arms, operating rods connected to said levers, and a lever for operating said operating rods.

5. A plow comprising a heel provided with a standard having a cut away portion, a sectional beam secured over the upper end of said standard, a blade mounted on the cut away portion of said standard, extending up between the sections of said beam, a shovel point mounted on the forward end of said standard, deflecting wings carried by said blade, and adjustably mounted disks arranged to the rear of said deflecting wings.

6. In a plow, the combination with a shovel point, of pivoted arms mounted to the rear of said point, disks adjustably mounted on said arms, levers connected to said arms, operating rods connected to said levers, a lever for operating said operating rod, and a knife carrying deflectors arranged in advance of said disks, for throwing the soil raised by the point in the path of said disks.

7. A plow comprising a heel carrying a standard, a sectional beam secured over the upper edge of said standard, a shovel point mounted on the forward end of said standard, arms pivotally mounted on each side of the standard, revoluble disks adjustably mounted on said arms, levers connected to said arms, operating rods mounted in guides connected to the standard and pivotally connected to said levers, a lever pivotally mounted between the sections of said beam provided with a curved lower end extending between the operating rods, and means for locking the lever in its adjusted position.

8. A plow comprising a sectional beam, a standard secured between the sections of said beam having a cutaway portion provided with a beveled edge, a heel secured on the lower end of said standard provided with openings, a knife arranged between the sections of said beam having a beveled lower edge adapted to rest on the bevel edge of the cut away portion of the standard, deflecting wings secured to the sides of the knife, a plate secured on said beam provided with openings in vertical alinement with the openings of the heel, shafts mounted in said openings, arms provided with sleeves adjustably mounted on said shafts, levers pivotally connected to the free ends of said arms, slidably mounted operating rods connected to said levers, and a lever for operating said operating rods.

JOHN S. PARK.

Witnesses:
 FRANK PARR,
 FRED PFEIFER.

---

Copies of this patent may be obtained for five cents each, by addressing the "Commissioner of Patents, Washington, D. C."